United States Patent Office 3,766,171
Patented Oct. 16, 1973

3,766,171
PREGNATETRAENES
Arthur Friedrich Marx and Hermanus Jacobus Kooreman, Delft, Netherlands, assignors to Koninklijke Nederlandsche Gist-en Spiritusfabriek, N.V., Delft, Netherlands
No Drawing. Filed Mar. 5, 1971, Ser. No. 121,581
Claims priority, application Great Britain, Mar. 6, 1970, 10,996/70
Int. Cl. C07c 173/00
U.S. Cl. 260—239.55 D                    40 Claims

ABSTRACT OF THE DISCLOSURE

New pregnatetraenes which possess oestrogenic and hypocholesterolemic activities have the following formula:

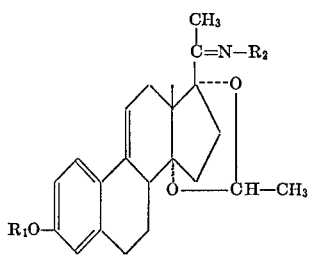

wherein $R_1$ represents a hydrogen atom, a lower alkyl group having less than 6 carbon atoms and which may be substituted by a dimethylamino group, or an acyl residue derived from an organic carboxylic acid or from an inorganic acid; $R_2$ represents a group $OR_3$, wherein $R_3$ represents a hydrogen atom, a lower alkyl group having less than 6 carbon atoms, an aryl group, an arylmethyl group or an acyl residue derived from an organic carboxylic acid or from an inorganic acid, or $R_2$ represents a group

wherein $R_4$ and $R_5$ may be the same or different and represent a hydrogen atom, a lower alkyl group having less than 6 carbon atoms, an acyl residue derived from an organic carboxylic acid, the carboxamide group or the group $-CO-CH_2-N^+(CH_3)_3Cl^-$.

This invention relates to new therapeutically useful pregnatetraenes, to processes for their preparation and to pharmaceutical compositions containing them.

The pregnatetraenes of the present invention are the new 20-iminopregnatetraene derivatives of the general formula:

(I)
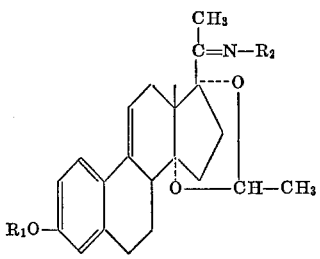

wherein $R_1$ represents a hydrogen atom, a lower alkyl group having less than 6 carbon atoms and which may be substituted by a dimethylamino group, or an acyl residue derived from an organic carboxylic acid or from an inorganic acid; $R_2$ represents a group $OR_3$, wherein $R_3$ represents a hydrogen atom, a lower alkyl group having less than 6 carbon atoms, an aryl group, an aryl-methyl group or an acyl residue derived from an organic carboxylic acid or from an inorganic acid, or $R_2$ represents a group

wherein $R_4$ and $R_5$ may be the same or different and represent a hydrogen atom, a lower alkyl group having less than 6 carbon atoms, an acyl residue derived from an organic carboxylic acid, the carboxamide group or the group $-CO-CH_2-N^+(CH_3)_3Cl^-$.

The pregnatetraenes of the general Formula I are therapeutically useful compounds possessing oestrogenic and hypocholesterolemic activities; in some cases there is a favorable ratio between both activities. These compounds can be applied for human as well as veterinary uses; they can be administered orally as well as parenterally.

The 20-iminopregnatetraene derivatives of the general Formula I may be prepared by methods known for the preparation of analogous compounds. The terms "methods known per se" and "in known manner" used hereafter refer to methods heretofore used or described in chemical literature.

According to a feature of the invention, the compounds of the general Formula I are prepared by reacting a pregnatetraen-20-one of the general formula (II)
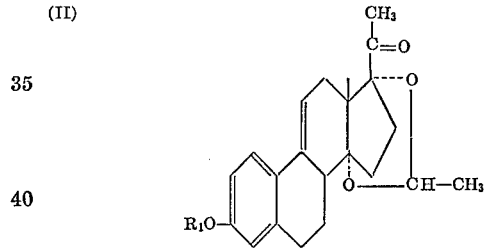

whereni $R_1$ is as hereinbefore defined, with an amine of the formula $H_2N-R_2$, wherein $R_2$ is as hereinbefore defined. The reaction is preferably carried out by refluxing the reactants in an inert organic medium, for example ethanol.

The pregnatetraenes of the general Formula II are new compounds; some of these are disclosed in our co-pending U.S. patent application Ser. No. 856,475, now U.S. 3,585,192.

The 14α,17α-ethylidenedioxypregnatetraenes for Formula II can be prepared by reacting a corresponding 14α, 17α-dihydroxypregnatetraene of the general formula:

(III)
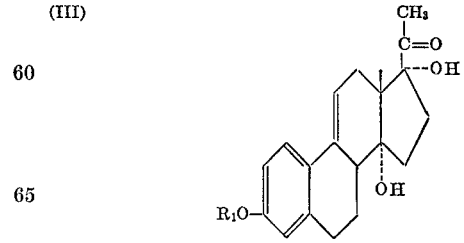

except the 3-hydroxy derivative which is disclosed in the specification of co-pending U.S. patent application Ser. No. 856,475 in Marx et al., wherein $R_1$ is as hereinbefore defined, with paraldehyde in the presence of a strong acid as catalyst, for example perchloric or p-toluene sulphonic acid, and in an inert organic solvent, for example dioxane or tetrahydrofuran.

The 14α,17α - dihydroxypregnatetraene derivatives of Formula III are new compounds too; they can be prepared in known manner. For example, the pregnatetraene of Formula III, wherein $R_1$ represents a hydrogen atom, i.e. 3,14α,17α - trihydroxy-19-norpregna-1,3,5(10),9(11)-tetraen-20-one, can be prepared in four reaction steps from 14α,17α-dihydroxyprogesterone.

(a) The latter compound can be microbiologically hydroxylated in the 11-position, for example with *Cunninghamella blackesleeana*, *Curvularia lunata*, or *Aspergillus ochraceus*, to give 11,14α,17α-trihydroxyprogesterone.

(b) The product of (a) can be dehydrated to the 9(11)-dehydro derivative, for example, by acylation for example with methane sulphonyl chloride, to give 11α,14α,17α-trihydroxyprogesterone 11-methane sulphonate, which, in a suitable organic solvent for example dimethylformamide, can then be heated with lithium chloride to give 14α,17α-dihydroxy - 9(11)-dehydroprogesterone. The 11β-isomer, 11β,14α,17α-trihydroxyprogesterone, can be reacted with N-bromo-acetamide to give the corresponding 9(11)- dehydro derivative. Preferably, this reaction is carried out at room temperature, in a suitable organic medium, for example pyridine.

(c) The product of (b) can be dehydrogenated in the 1,2-position, for example by reaction with selenium oxide or 2,3-dichloro-4,5-dicyano-benzoquinone, or by fermentation with a suitable microorganism, such as *Corynebacterium simplex*, to give 14α,17α-dihydroxy-1,9(11)-bisdehydroprogesterone, that is, 14α,17α-dihydroxy-pregna-1,4,9 (11)-triene-3,20-dione.

(d) The above pregnatriene can then be aromatized, for example by heating in pyridine with zinc dust, to give 3,14α,17α - trihydroxy - 19-nor-pregna-1,3,5(10),9(11)-tetraen-20-one.

This compound can then be used in the above reaction with paraldehyde to prepare 3 - hydroxy-14α,17α-ethylidenedioxy - 19 - nor-pregna-1,3,5(10),9(11)-tetraen-20-one. The latter compound can then be used again to prepare other 14α,17α - ethylidenedioxy-pregnatetraenes of Formula II.

For example, the pregnatetraenes of Formula II, wherein $R_1$ represents a lower alkyl group which may be substituted by a dimethylamino group, can be prepared by reacting 3 - hydroxy - 14α,17α - ethylidenedioxy-19-nor-pregna-1,3,5(10),9(11)-tetraen-20-one with an appropriate halide of the formula $R_1$-hal or a sulphate of the formula $(R_1)_2SO_4$, preferably in an organic medium, for example tetrahydrofuran or chloroform, and in the presence of an alkali metal hydroxide solution or an alkali metal alkyl solution, for example butyl lithium in n-hexane.

The pregnatetraenes of Formula II, wherein $R_1$ represents an acyl residue can be prepared by reacting 3-hydroxy - 14α,17α-ethylidenedioxy-19-nor-pregna-1,3,5(10),9(11)-tetraen-20-one with the appropriate acid anhydride in the presence of an acid or alkaline catalyst or by reaction with an acid halide in an organic solvent, for example pyridine. Anhydrides and acyl halides of carboxylic acids which have up to 11 carbon atoms are most generally employed including cylic carboxylic acids such as adamantane carboxylic acid.

According to a modification of these processes, 3-hydroxy - 14α,17α-ethylidenedioxy-19-nor-pregna-1,3,5(10), 9(11)-tetraen-20-one is first reacted with an amine of the formula $H_2N—R_2$ to form a 20-iminopregnatetraene of Formula I, wherein $R_1$ represents a hydrogen atom, and then this compound is converted into the corresponding 3-ether or 3-ester in the manner described above.

Pregnatetraenes of general Formula I prepared according to the process described above can be converted into other 20-iminopregnatetraenes of the invention.

For example, a pregnatetraen-20-one 20-oxime of the general formula:

(IV)

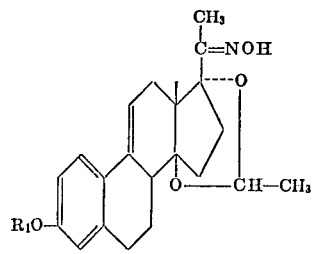

wherein $R_1$ is as hereinbefore defined, can be converted into a 20-iminopregnatetraene of the Formula I, wherein $R_3$ represents a lower alkyl group having less than 6 carbon atoms, an aryl group or an aryl methyl group, by reaction with an appropriate halide of the formula $R_3$-hal or a sulphate of the formula $(R_3)_2SO_4$ in analogous manner as described above for the preparation of pregnatetraenes of Formula II, wherein $R_1$ represents a lower alkyl group. Phenyl and benzyl groups are particularly preferred as the aryl and aryl-methyl groups respectively.

Pregnatetraenes of the general Formula I, wherein $R_3$ represents an acyl residue derived from an organic acid or from an inorganic acid, can be prepared by reacting a pregnatetraen-20-one 20-oxime of the Formula IV with an appropriate acid anhydride or halide. The reaction is preferably carried out in an organic medium, for example pyridine, at room temperature. The acyl group may be from almost any carboxylic acid, including hetero carboxylic acids, i.e. acetic acid, myristic acid, isonicotinic acid, thiophene carboxylic acid and the like. Most preferably, the acyl group contains up to 14 carbon atoms.

When in these processes the starting material is a pregnatetraen-20-one 20-oxime of Formula IV, wherein $R_1$ represents a hydrogen atom, this hydrogen atom will simultaneously be replaced too by the group $R_3$, whereby the corresponding 3-ethers or 3-esters are obtained.

Pregnatetraen-20-one 20-hydrazones of the general formula:

(V)

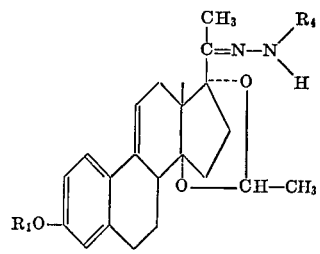

wherein $R_1$ is as hereinbefore defined and $R_4$ represents a hydrogen atom or a lower alkyl group having less than 6 carbon atoms, can also be converted into other 20-iminopregnatetraenes of the invention.

Pregnatetraenes of the general Formula I, wherein $R_5$ represents an acyl residue derived from an organic carboxylic acid, can be prepared by reacting a pregnatetraen-20-one 20-hydrazone of Formula V with an appropriate acid anhydride or halide in the same manner as described above for the preparation of other acyl derivatives. Anhydrides and acyl halides of carboxylic acids which have up to 11 carbon atoms are most generally employed, including cyclic carboxylic acids such as adamantane carboxylic acid.

In case $R_4$ represents a hydrogen atom and the reaction is carried out with a halide of an organic carboxylic acid, generally pregnatetraen-20-one 20-N,N-diacylhydrazones are obtained.

When a pregnatetraen-20-one 20-hydrazone of the Formula V, wherein $R_1$ represents a hydrogen atom, is reacted as described above, with an acid anhydride or acyl halide, the 3-hydroxyl group is converted simultaneously into the corresponding 3-ester group.

The pharmaceutical compositions of the invention comprise at least one 20-iminopregnatetraene of general Formula I and a pharmaceutically acceptable carrier or diluent. The compositions may take any of the forms customarily employed for administration of therapeutically atcive substances, but the preferred types are those suitable for oral administration, especially tablets, including sustained release tablets, pills and capsules, and those suitable for parenteral administration.

The tablets and pills may be formulated in the usual manner with one or more pharmaceutically acceptable diluents or excipients, and can include lubricants. Capsules made of adsorbable material, such as gelatin, may contain the active substance alone or in a mixture, with a solid or liquid diluent. Liquid preparations may be in the form of suspensions, emulsions, syrups or elixirs of the active substance in water or other liquid media commonly used for making orally acceptable pharmaceutical formulations.

The active substance may also be made up in a form suitable for parenteral administration, i.e. as a suspension or emulsion in sterile water or an organic liquid usually employed for injectable preparations, for example a vegetable oil such as corn or olive oil, or a sterile solution in water or an organic solvent.

For parenteral administration, the daily dosage may be 100 to 250 mg.; a suitable concentration of the active compound in an injectable preparation is 100 mg./ml. For oral administration, the daily dosage may be 0.1–50 mg.

A suitable pharmaceutical composition of the invention can be prepared by dissolving 8 g. of 3-methoxy-14γ,17γ-ethylidenedioxy - pregna - 1,3,5(10),9(11)-tetraen-20-one 20-N-methylhydrazone in 1 l. of purified corn oil and filtering the solution obtained. Soft gelatine capsules are then filled each with 0.25 ml. of this solution.

The following examples illustrate the preparation of the new pregnatetraenes of the present invention.

EXAMPLE I (a) 5.5 l. of nutrient medium consisting of 0.5% of glucose and 0.5% of corn steep liquor were inoculated with 275 ml. of shake culture of *Aspergillus ochraceus*. The microorganism was grown at 26° C. with vigorous stirring and aeration. After 24 hours a solution of 1.4 g. of 14α,17α-dihydroxyprogesterone in 20 ml. of dimethylformamide was added. After 72 hours, the conversion being complete, the culture broth was filtered and the filtrate extracted three times with 1 l. of methyl isobutyl ketone. The extract was concentrated under reduced pressure and the residue crystallized from methanol; yield: 0.4 g. of 11α,14α,17α-trihydroxyprogesterone.

Melting point: 232–234.5° C.

I.R. (in $CHCl_3$): $\nu_{max.}$=3608, 3485, 1711, 1665, 1612 and 1350 cm.$^{-1}$.

(b) To a stirred suspension of 5 g. of 11α,14α,17α-trihydroxyprogesterone in 50 ml. of pyridine, 1.2 ml. of methane sulphonylchloride was added dropwise. The reaction mixture was kept at room temperature for 90 minutes and then poured into 750 ml. of water, thereby obtaining 5.6 g. of 11α,14α,17α-trihydroxyprogesterone 11-methane sulphonate.

Melting point: 160–161° C.

I.R. (in $CHCl_3$): $\nu_{max.}$=3600, 3505, 1709, 1665, 1610, 1350, 1333, 1170, 921 and 900 cm.$^{-1}$.

(c) A solution of 5.5 g. of 11α,14α,17α-trihydroxyprogesterone 11-methane sulphonate and 5.5 g. of lithium chloride in 55 ml. of dimethylformamide was kept at 100° C. for 30 minutes. To the cooled reaction mixture 20 ml. of water were added, yielding 3.5 g. of 14α,17α-dihydroxy-9(11)-dehydroprogesterone.

Melting point: 235–241° C.

N.M.R. (in $CDCl_3$+some DMSO-$d_6$): δ=0.58, 1.34, 2.15, about 4.0, 5.58 and 5.68 p.p.m.

Molecular ion peak in mass spectrum:
Calculated for $C_{21}H_{28}O_4$: 344; found: 344.

(d) A mixture of 10 g. of 14α,17α-dihydroxy-9(11)-dehydroprogesterone, 6.6 g. of selenium oxide, 2 ml. of pyridine and 500 ml. of tert. butanol was refluxed for 17 hours. The precipitated selenium was filtered off, the filtrate diluted with 2.5 l. of methyl isobutyl ketone and washed with N sodium hydroxide solution, 0.5 N sulfuric acid and water. The organic fraction was concentrated and the brown, crystalline residue triturated with 50 ml. of methanol yielding 2.0 g. of nearly white 14α,17α-dihydroxy-1,9(11)-bisdehydroprogesterone.

Melting point: 268–272° C.

I.R. (in $CHCl_3$): $\nu_{max.}$=3605, 3560, 3475, 1710, 1662, 1622, 1603 and 1350 cm.$^{-1}$.

(e) A mixture of 1.0 g. of 14α,17α-dihydroxy-1,9(11)-bisdehydroprogesterone, 30 ml. of pyridine containing 0.5 ml. of water, and 20 g. of zinc dust was heated under reflux with stirring for 210 min. After cooling, the zinc was removed by filtration and washed with methyl isobutyl ketone. The filtrate was concentrated and the residue dissolved in 25 ml. of methyl isobutyl ketone and this solution was washed with N sulfuric acid and water. The solvent was evaporated in vacuo and the residue was crystallized from methanol; yield 0.50 g. of 3,14α,17α-trihydroxy - 19 - nor-pregna-1,3,5(10),9(11)-tetraen-20-one.

Melting point: 230–235° C.

N.M.R. (in a mixture of $CDCl_3$ and DMSO-$d_6$): δ=0.68, 2.23, 6.23 (broad), 6.55, 6.6 and 7.5 (AB-spectrum) p.p.m.

(f) 2.5 g. of 3,14α,17α-trihydroxy-19-nor-pregna-1,3,5-(10),9(11)-tetraen-20-one were stirred during 10 minutes at room temperature with 15 ml. of dioxane, 15 ml. of paraldehyde and 0.13 ml. of a 70% perchloric acid solution in water. The reaction mixture was diluted with methyl isobutyl ketone and the solution was washed with a sodium bicarbonate solution and with water. Yield: 600 mg. of 3-hydroxy-14α,17α-ethylidenedioxy-19-nor-pregna-1,3,5(10),9(11)-tetraen-20-one.

Melting point: 198–202° C.

N.M.R. (in $CDCl_3$): δ=0.78, 1.34 (dublet), 2.22, 5.21 (quadruplet), 6.19, 6.60, 6.7–7.5 (AB-spectrum) p.p.m.

(g) 17.5 g. of 3-hydroxy-14α,17α-ethylidenedioxy-19-nor-pregna-1,3,5(10),9(11)-tetraen-20-one were stirred in a mixture of 350 ml. of chloroform and 350 ml. of a 30% potassium hydroxide solution in water. 70 ml. of dimethyl sulphate were added dropwise and the mixture was stirred for another 15 minutes at room temperature. The organic layer was separated and washed with water until neutral and then concentrated by evaporation of the solvent. The solid residue was crystallised from methanol.

Yield: 12.9 g. of 3-methoxy-14α,17α-ethylidenedioxy-19-nor-pregna-1,3,5(10),9(11)-tetraen-20-one.

Melting point: 153–157° C.

I.R. (in $CHCl_3$): $\nu_{max.}$=2843, 1710, 1630, 1608, 1565, 1492, 1360 and 1140 cm.$^{-1}$.

(h) To a stirred solution of 37.5 g. of hydroxyl amine hydrochloride in 150 ml. of water were subsequently added 150 ml. of a 10% solution of sodium hydroxide in water, 15 g. of 3-methoxy-14α,17α-ethylidenedioxy-19-nor-pregna-1,3,5(10),9(11)-tetraen-20-one and 1 l. of ethanol. The mixture was boiled and then water was added until dissolving was completed. After heating under reflux for 10 minutes the hot reaction mixture was filtrated and the filtrate was cooled in a refrigerator.

Yield: 12.7 g. of 3-methoxy-14α,17α-ethyliedendioxy-19-nor-pregna-1,3,5(10),9(11)-tetraen-20-one 20-oxime.

Melting point: 190–192.5° C.

$[\alpha]_D$=+121° (c.=0.5; $CHCl_3$).

$\lambda_{max.}$ (in $CH_3OH$): 263, 299 and 308 nm.; $E_{1\,cm.}^{1\%}$=454, 79 and 60.

I.R. (in $CHCl_3$): $\nu_{max.}$=about 3590, 2842, 1630, 1607, 1565, 1490 and 1112 cm.$^{-1}$.

N.M.R. (in CDCl₃): δ=0.79, 1.31 (doublet), 1.97, 3.79, 5.25 (quadruplet), 6.27, 6.63, 6.7 and 7.6 (AB-spectrum) p.p.m.

Molecular ion peak in mass spectrum:
Calculated for $C_{23}H_{29}NO_4$: 383; found: 383.

EXAMPLE II

In an analogous way to the procedure described in Example I, 3 - hydroxy - 14α,17α - ethylidenedioxy-19-nor-pregna-1,3,5(10),9(11)-tetraen-20-one (prepared according to the procedure of Example I(a–f) was converted into 3 - hydroxy-14α,17α-ethylidenedioxy-19-nor-pregna-1,3,5(10),9(11)-tetraen-20-one 20-oxime.

Melting point: 250–258° C.

I.R. (in KBr): 3425, 3058, 1625, 1604, 1575, 1495, 1400, 1122, 1109, 950, 930 cm.⁻¹.

N.M.R.: (CDCl₃+DMSO): δ=0.76, 1.27 (doublet), 1.89, 5.20 (quadruplet), 6.15, 6.50, 6.60–7.45 (AB-spectrum), 8.4, 9.7 p.p.m.

Molecular ion peak in mass spectrum: 369.
Calculated for $C_{22}H_{27}O_4N$: 369.

EXAMPLE III

To a solution of 5 g. of 3-methoxy-14α,17α-ethylidenedioxy-19-nor-pregna - 1,3,5(10),9(11)-tetraen-20-one 20-oxime (prepared according to the procedure of Example I) in 50 ml. of tetrahydrofuran 8.5 ml. of a 20% solution of butyl lithium in n-hexane and 15 ml. of methyl iodide were successively added. After one hour of refluxing, the conversion being complete, the reaction mixture was dissolved in methyl isobutyl ketone. The solution was washed with water and the solvent evaporated under reduced pressure. The residue was crystallized twice from a methanol/methylene chloride mixture. The yield was 4.06 g. of pure 3-methoxy-14α,17α-ethylidenedioxy-19-nor-pregna-1,3,5(10),9(11)-tetraen-20-one 20-O-methyl-oxime.

Melting point: 160–162° C.

I.R. (in KBr): 3040, 1630, 1605, 1570, 1492, 1400, 1258, 1128, 1110 cm.⁻¹.

N.M.R. (in CDCl₃): δ=0.78, 1.28 (doublet), 1.88, 3.73, 3.83, 5.2 (quadruplet), 6.2, 6.5, 6.6 and 7.5 (AB-spectrum) p.p.m.

Molecular ion peak in mass spectrum: 397.
Calculated for $C_{24}H_{31}NO_4$: 397.

EXAMPLE IV

In an analogous way to the procedure described in Example III, 5 g. of 3-methoxy-14α,17α-ethylidenedioxy-19-nor-pregna-1,3,5(10),9(11)-tetraen-20-one 20 oxime were converted with 8.5 ml. of butyl lithium solution in n-hexane and 10 ml. of benzylbromide in 4.0 g. of pure 3. - methoxy-14α,17α-ethylidenedioxy-19-nor-pregna-1,3,5 (10),9(11)-tetraen-20-one 20-O-benzyl oxime.

Melting point: 115–116° C.

I.R. (in KBr): 3090, 3070, 3032, 1630, 1605, 1580, 1569, 1492, 1400, 1259, 1128, 1110, 730, 688 cm.⁻¹.

N.M.R. (in CDCl₃): δ=0.68, 1.25 (doublet), 1.90, 3.68, 5.05, 5.15 (quadruplet), 62, 6.55, 6.6 and 7.5 (AB-spectrum) p.p.m.

Molecular ion peak in mass spectrum: 473.
Calculated for $C_{30}H_{36}NO_4$: 473.

EXAMPLE V 5 g. of 3 - methoxy-14α,17α-ethylidenedioxy-19-nor-pregna-1,3,5(10),9(11)-tetraen-20-one 20-oxime were refluxed with 8.5 ml. of n-butyl lithium solution in n-hexane (20%) and 15 ml. of n-propyl iodide in 50 ml. of tetrahydrofuran. The conversion was complete within three hours. After the usual working up 2.67 g. of pure 3-methoxy-14α,17α-ethylidenedioxy - 19 - nor-pregna-1,3,5 (10),9(11)-tetraen-20-one 20-O-n-propyl-oxime were obtained.

Melting point: 66–68° C.

I.R. (in KBr): 3040, 1630, 1608, 1570, 1492, 1400, 1260, 1130, 1110 cm.⁻¹,

N.M.R. (in CDCl₃): δ=0.81, 0.92 (triplet), 1.29 (doublet), 1.88, 3.71, 3.99 (triplet), 5.2 (quadruplet), 6.2, 6.55, 6.6 and 7.5 (AB-spectrum) p.p.m.

Molecular ion peak in mass spectrum: 425.
Calculated for $C_{26}H_{35}NO_4$: 425.

EXAMPLE VI

A solution of 5 g. of 3-methoxy-14α,17α-ethylidenedioxy-19-nor-pregna - 1,3,5(10),9(11)-tetraen-20-one 20-oxime in 50 ml. of anhydrous tetrahydrofuran was reacted successively with 8.5 ml. of a n-butyl lithium solution in n-hexane (20%) and 15 ml. of isobutyl iodide. Even after a refluxing period of 46 hours about ten percent was not converted. The reaction mixture was dissolved in methyl isobutyl ketone, washed with water and concentrated under reduced pressure. The residue was dissolved in benzene and chromatographed on a silicagel column with benzene-3% acetone as eluent.

The desired fractions were collected, the solvent evaporated and the residue crystallized from methanol. The yield was 3.31 g. of 3-methoxy-14α,17α-ethylidenedioxy-19-nor-pregna-1,3,5(10),9(11) - tetraen-20-one 20-O-(2-methyl)propyl oxime.

Melting point: 95–97° C.

I.R. (in KBr): 3037, 1629, 1603, 1566, 1491, 1398, 1255, 1124, 1108 cm.⁻¹.

N.M.R. (in CDCl₃): δ=0.76, 0.85, 0.94, 1.26 (doublet), 1.86, 3.70, 5.18, 6.15, 6.51, 6.6 and 7.5 (AB-spectrum) p.p.m.

Molecular ion peak in mass spectrum: 439.
Calculated for $C_{27}H_{37}NO_4$: 439.

EXAMPLE VII

To a solution of 7.05 g. of 3-hydroxy-14α,17α-ethylidenedioxy-19-nor-pregna-1,3,5(10),9(11) - tetraen-20-one in 200 ml. of anhydrous dimethyl formamide 7.2 g. of sodium hydride and 17.6 g. of 2-dimethylaminoethyl chloride hydrochloride were successively added. For three hours the mixture was stirred at room temperature. Methyl isobutyl ketone was added and the mixture was washed several times with water. The organic solvent was evaporated under reduced pressure and the residue was dissolved in 560 ml. of ethanol. To 280 ml. of this solution were added 10 g. of hydroxylamine hydrochloride dissolved in 80 ml. of 5% sodium hydroxide solution. The mixture was refluxed for 20 minutes. Methyl isobutyl ketone was added and the organic solution was washed several times with water. The organic solvent was evaporated under reduced pressure, the residue dissolved in methylene chloride and chromatographed on an alumina column with methylene chloride-1% methanol. From the correct fractions 2.0 g. of pure 3-(2-dimethylamino) ethoxy - 14α,17α - ethylidenedioxy - 19 - nor-pregna-1,3,5(10),9(11)-tetraen-20-one 20-oxime were obtained.

Melting point: 160–165° C.

I.R. (in KBr): 3260, 3060, 3030, 2790, 1630, 1610, 1570, 1500, 1405, 1236, 1112, 959 cm.⁻¹.

N.M.R. (in CDCl₃, DMSO-D₆): δ=0.75, 1.25 (doublet), 1.88, 2.54, 3.00 (triplet), 4–5 (broad), 4.17 (triplet), 5.20 (quadruplet), 6.20, 6.58, 6.67 and 7.53 (AB-spectrum) p.p.m.

EXAMPLE VIII

A solution of 5 g. of 3-methoxy-14α,17α-ethylidenedioxy-19-nor-pregna - 1,3,5(10),9(11)-tetraen-20-one 20-oxime in 25 ml. of pyridine and 6 ml. of acetic anhydride was kept at room temperature. After one hour 100 ml. of water were slowly added and a crystalline precipitate appeared. After cooling of the mixture the crystals were filtered off and dried. The yield was 5.27 g. of 3-methoxy-14α,17α-ethylidenedioxy-19-nor-pregna - 1,3,5(10),9(11)-tetraen-20-one 20-O-acetyl-oxime. Crystallization from a methanol/methylene chloride mixture yielded 3.44 g. of pure product.

Melting point: 146–148° C.

I.R. (in KBr): 3028, 2849, 1770, 1630, 1569, 1495, 1402, 1198, 1110 cm.$^{-1}$.

N.M.R. (in CDCl$_3$): δ=0.83, 1.29 (doublet), 2.01, 2.18, 3.73, 5.2 (quadruplet), 6.2, 6.55, 6.6 and 7.5 (AB-spectrum) p.p.m.

Molecular ion peak in mass spectrum: 425.

Calculated for C$_{15}$H$_{31}$NO$_5$: 425.

EXAMPLE IX

In an analogous way to the procedure described in Example VIII, 5 g. of 3-methoxy-14α,17α-ethylidenedioxy-19-nor-pregna-1,3,5(10),9(11) - tetraen-20-one 20-oxime were converted with pivaloyl chloride into 5.34 g. of pure 3-methoxy - 14α,17α - ethylidenedioxy - 19 - nor-pregna-1,3,5(10),9(11)-tetraen-20-one 20-O-pivaloyl-oxime.

Melting point: 188–189° C.

I.R. (in KBr): 3040, 2838, 1755, 1630, 1609, 1570, 1495, 1260, 1110 cm.$^{-1}$.

N.M.R. (in CDCl$_3$): δ=0.86, 1.24, 2.0, 3.73, 5.2 (quadruplet), 6.2, 6.55, 6.6 and 7.5 (AB-spectrum) p.p.m.

Molecular ion peak in mass spectrum: 467.

Calculated for C$_{28}$H$_{37}$NO$_5$: 467.

EXAMPLE X

In an analogous way to the procedure described in Example VIII, 5 g. of 3-methoxy-14α,17α-ethylidenedioxy-19-nor-pregna-1,3,5(10),9(11) - tetraen-20-one 20-oxime were converted with 7.5 g. of isonicotinic anhydride into 5.76 g. of pure 3-methoxy-14α,17α-ethylidenedioxy-19-nor-pregna-1,3,5(10),9(11)-tetraen - 20 - one 20-O-isonicotinoyl-oxime.

Melting point: 206–209° C.

I.R. (in KBr): 3030, 2830, 1750, 1628, 1600, 1589, 1563, 1552, 1490, 1400, 1256, 1240, 1105 cm.$^{-1}$.

N.M.R. (in CDCl$_3$): δ=0.90, 1.30 (doublet), 2.15 3.73, 5.2 (quadruplet), 6.2, 6.55, 6.6 and 7.5 (AB-spectrum), 7.8, 8.7 p.p.m.

Calculated for C$_{29}$H$_{32}$N$_2$O$_5$: 488.

EXAMPLE XI

In an analogous way to the procedure described in Example VIII, 5 g. of 3-methoxy-14α,17α-ethylidenedioxy-19-nor-pregna-1,3,5(10),9(11) - tetraen-20-one 20-oxime were converted with 17.5 g. of benzoic anhydride into 5.4 g. of pure 3-methoxy-14α,17α-ethylidenedioxy-19-nor-pregna-1,3,5(10),9(11) - tetraen-20-one 20-O-benzoyl-oxime.

Melting point: 175–176° C.

I.R. (in KBr): 3035, 1750, 1630, 1606, 1581, 1570, 1490, 1402, 1260, 1128, 1110, 701 cm.$^{-1}$.

N.M.R. (in CDCl$_3$): δ=0.91, 1.30 (doublet), 2.13, 3.72, 5.23 (quadruplet), 6.2, 6.55, 6.6, 7.47 (multiplet), 8.0 (multiplet) p.p.m.

Molecular ion peak in mass spectrum: 487.

Calculated for C$_{30}$H$_{33}$NO$_5$: 487.

EXAMPLE XII

To a solution of 5 g. of 3-methoxy-14α,17α-ethylidenedioxy-19-nor-pregna - 1,3,5(10),9(11) - tetraen - 20 - one 20-oxime in pyridine 5 g. of adamantane carbonyl chloride were added. After one hour, the conversion being complete, water, and methylene chloride were added. The mixture was shaken, the organic layer separated and washed with N sodium hydroxide solution and with water until neutral. After evaporating the solvent under reduced pressure the residue was crystallized from boiling methanol. 6.3 g. of pure 3-methoxy-14α,17α-ethylidenedioxy-19-nor-pregna-1,3,5(10),9(11)-tetraen-20-one 20-O-adamantanecarbonyl-oxime were obtained.

Melting point: 232–236° C. (destr.).

I.R. (in KBr): 3038, 1758, 1630, 1605, 1568, 1492, 1400, 1103 cm.$^{-1}$.

N.M.R. (in CDCl$_3$): δ=0.85, 1.28, 1.75, 2.0, 3.73, 5.2 (quadruplet), 6.2, 6.55, 6.6 and 7.5 (AB-spectrum) p.p.m.

Molecular ion peak in mass spectrum: 545.

Calculated for C$_{34}$H$_{43}$NO$_5$: 545.

EXAMPLE XIII 10 g. of 3-methoxy - 14α,17α - ethylidenedioxy-19-nor-pregna-1,3,5(10),9(11)-tetraen-20-one 20-oxime and 20 ml. of myristoylchloride were dissolved in 50 ml. of pyridine. After 30 minutes of stirring at room temperature, the conversion being complete, water was added. The fatty precipitate was collected (18.2 g.). To remove the excess myristic acid the crystals were stirred with 75 ml. of heptane. After filtration, evaporation of the solvent and recrystallization of the residue in 100 ml. of warm heptane 6.38 g. of pure 3-methoxy-14α,17α-ethylidenedioxy-19-nor-pregna - 1,3,5(10),9(11) - tetraen - 20 - one 20-O-myristoyl-oxime were obtained.

Melting point: 82–84.5° C.

I.R. (in KBr): 3060, 3028, 1780, 1735, 1625, 1605, 1568, 1492, 1403, 1225, 1103 cm.$^{-1}$.

N.M.R. (in CDCl$_3$): δ=0.83, 0.88 (triplet), 1.26, 1.3 (doublet), 2.0, 3.73, 5.2 (quadruplet), 6.2, 6.55, 7.5 and 6.6 (AB-spectrum) p.p.m.

Molecular ion peak in mass spectrum: 593.

Calculated for C$_{37}$H$_{55}$NO$_5$: 593.

EXAMPLE XIV

A solution of 18 ml. of chlorosulfonic acid in 50 ml. of anhydrous methylenechloride was dropwise added to 100 ml. of anhydrous pyridine. The mixture was fastly stirred and kept at a temperature of —20°–0° C. with an acetone/Dry Ice mixture. To the thick slurry a solution of 4.2 g. of 3-hydroxy-14α,17α-ethylidenedioxy-19-nor-pregna - 1,3,5(10),9(11) - tetraen-20-one 20-oxime in 50 ml. of anhydrous pyridine was added. The mixture was heated until a clear solution was obtained. The reaction mixture was diluted with water and the methylenechloride layer separated. The water layer was extracted four times with 250 ml. of ether to remove the pyridine and was next acidified with 6 N sulfuric acid to pH=1. After adding acetone and shaking, two layers were formed. Within two days crystals precipitated from the separated water layer. After filtration and drying 1 g. of product was obtained. This was recrystallized from acetone and chromatographic pure 14α,17α-ethylidenedioxy-20-hydrogen sulfate imino - 19-nor-pregna-1,3,5(10),9(11)-tetraen-3-yl 3-hydrogen sulphate was obtained.

Melting point of the sodium salt: 110° C. (decomp.).

I.R. (in KBr): 3250–3050, 2700, 1630, 1603, 1563, 1485, 1400, ~1270, ~1210, 1132, 1103 cm.$^{-1}$.

N.M.R. (in sodium bicarbonate solution): δ=7.6, 1.27 (doublet), 2.00, 5.32 (quadruplet), 6.38, 7.00, 7.05, 7.70 (AB-spectrum) p.p.m.

EXAMPLE XV 10 g. of 3-methoxy - 14α,17α - ethylidenedioxy-19-nor-pregna-1,3,5(10),9(11)-tetraen-20-one were refluxed for three hours in 100 ml. of ethanol with 40 ml. of triethylamine and 10 ml. of hydrazine hydrate. The reaction product was precipitated by the addition of water and after cooling 7.94 g. of the hydrazone were obtained. These were crystallized from a methanol/methylene chloride mixture, yielding 6.20 g. of pure 3-methoxy-14α,17α-ethylidenedioxy - 19 - nor-pregna-1,3,5(10),9(11)-tetraen-20-one 20-hydrazone.

Melting point: 146–148° C.

I.R. (in KBr): 3396, 3040, 1630, 1604, 1568, 1492, 1400, 1270, 1128, 1110 cm.$^{-1}$.

N.M.R. (in CDCl$_3$): δ=0.73, 1.29 (doublet), 1.76, 3.72, ~5.0 (broad), 5.2 (quadruplet), 6.2, 6.55, 6.6 and 7.5 (AB-spectrum) p.p.m.

Molecular ion peak in mass spectrum: 382.

Calculated for C$_{23}$H$_{30}$N$_2$O$_3$: 382.

EXAMPLE XVI 5 g. of 3-methoxy-14α,17α-ethylidenedioxy-19-nor-pregna-1,3,5(10),9(11)-tetraen-20-one were refluxed for 3.5 hours in 35 ml. of ethanol (96%) and 15 ml. of methyl hydrazine. After cooling the precipitate crystals were collected and dried (5.10 g.). After crystallizing from a methanol/methylene chloride mixture 3.9 g. of pure 3-methoxy-14α,17α-ethylidenedioxy-19-nor-pregna-1,3,5(10),9(11)-tetraen-20-one 20-N-methyl hydrazone were obtained.

Melting point: 174–189° C.

I.R. (in KBr): 3303, 3035, 2800, 1630, 1603, 1567, 1492, 1400, 1255, 1125, 1103 cm.$^{-1}$.

N.M.R. (in CDCl$_3$): δ=0.74, 1.28, 1.72, 2.90, 3.71, ≈4.2 (broad), 5.2 (quadruplet), 6.2, 6.55, 6.6 and 7.5 (AB-spectrum) p.p.m.

Molecular ion peak in mass spectrum: 396.

Calculated for $C_{24}H_{32}N_2O_3$: 396.

EXAMPLE XVII

In an analogous way to the procedure described in Example XVI, 4.5 g. of 3-hydroxy-14α,17α-ethylidenedioxy-19-nor-pregna-1,3,5(10),9(11)-tetraen-20-one were converted to 4.6 g. of pure 3-hydroxy-14α,17α-ethylidenedioxy-19-nor-pregna-1,3,5(10),9(11)-tetraen-20-one 20-N-methyl hydrazone.

Melting point: 220–225° C.

I.R. (in KBr): 3350, 3243, 1630, 1605, 1572, 1444, 1402, 1110 cm.$^{-1}$.

N.M.R. (in CDCl$_3$+DMSO): δ=0.73, 1.25, 1.72, 2.88, 4.0 (broad), 5.2 (quadruplet), 6.13, 6.5, 6.55 and 7.45 (AB-spectrum) p.p.m.

Molecular ion peak in mass spectrum: 382.

Calculated for $C_{23}H_{30}O_3N_2$: 382.

EXAMPLE XVIII

To a solution of 15 g. of 3-hydroxy-14α,17α-ethylidenedioxy-19-nor-pregna-1,3,5(10),9(11)-tetraen-20-one in 300 ml. of tetrahydrofuran were successively added 13 ml. of a butyl lithium solution in n-hexane (20%) and 30 ml. of isopropyl iodide. The mixture was refluxed on the steam bath for three days. After the usual working-up the reaction product was chromatographed on a silicagel column with benzene. The desired fractions were collected, the solvents evaporated and the residue crystallized from methanol.

The yield was 5.25 g. of 3-isopropoxy-14α,17α-ethylidenedioxy-19-nor-pregna-1,3,5(10),9,(11)-tetraen-20-one. The N.M.R. spectrum was in agreement with the expectation.

Melting point: 79–82° C.

A solution of 3 g. of the isopropyl-ether in 20 ml. of ethanol was refluxed with 15 ml. of methyl hydrazine during 7 hours. After cooling water was added and from this mixture 2.95 g. of chromatographic pure 3-isopropoxy-14α,17α-ethylidenedioxy-19-nor-pregna-1,3,5-(10),9(11)-tetraen-20-one 20-N-methyl hydrazone were obtained.

Melting point: 120–131° C.

I.R. (in KBr): 3290, 3030, 1630, 1608, 1565, 1492, 1407, 1255, 1125, 1110 cm.$^{-1}$.

N.M.R. (in CDCl$_3$): δ=0.76, 1.28 (doublet), 1.72, 2.92, 4.0–5.0 (broad), 4.46 (septet), 5.21 (quadruplet), 6.21, 6.5, 6.6 and 7.5 (AB-spectrum) p.p.m.

Molecular ion peak in mass spectrum: 424.

Calculated for $C_{26}H_{36}O_3N_2$: 424.

EXAMPLE XIX 5 g. of 3-methoxy-14α,17α-ethylidenedioxy-19-nor-pregna-1,3,5(10),9(11)-tetraen-20-one were refluxed for one hour in a mixture of 35 ml. of ethanol (96%), 35 ml. of triethylamine and 10 g. of ethyl hydrazine oxalate. Water was added and the precipitated crystals were filtered off and recrystallized from a methanol/chloride mixture. 4.2 g. of pure 3-methoxy-14α,17α-ethylidenedioxy-19-nor-pregna-1,3,5(10),9(11)-tetraen-20-one-20-N-ethyl hydrazone were obtained.

Melting point: 168–176° C.

I.R. (in KBr): 3280, 3032, 1630, 1605, 1568, 1492, 1409, 1255, 1130, 1110 cm.$^{-1}$.

N.M.R. (in CDCl$_3$): δ=0.75, 1.12 (triplet), 1.28 (doublet), 1.72, 3.2 (quadruplet), 3.7, 4.25, 5.18 (quadruplet), 6.2, 6.55, 6.6 and 7.5 (AB-spectrum) p.p.m.

Molecular ion peak in mass spectrum: 410.

Calculated for $C_{25}H_{34}N_2O_3$: 410.

EXAMPLE XX

In an analogous way to procedure described in Example XIX, 5 g. of 3-methoxy-14α,17α-ethylidenedioxy-19-nor-pregna-1,3,5(10),9(11)-tetraen-20-one were converted with 10 g. of propyl hydrazine oxalate to 4.9 g. of pure 3-methoxy-14α,17α-ethylidenedioxy-19-nor-pregna-1,3,5(10),9(11)-tetraen-20-one 20-N-propyl hydrazone.

Melting point: 169–176° C.

I.R. (in KBr): 3300, 3270, 3032, 1630, 1602, 1565, 1490, 1403, 1125, 1110 cm.$^{-1}$.

N.M.R. (in CDCl$_3$): δ=0.73, 0.90 (triplet), 1.28 (doublet), 1.72, 3.1 (triplet), 3.7, 4.45, 5.15 (quadruplet), 6.2, 6.55, 6.6 and 7.5 (AB-spectrum) p.p.m.

Molecular ion peak in mass spectrum: 424.

Calculated for $C_{26}H_{36}N_2O_3$: 424.

EXAMPLE XXI

A solution of 5 g. of 3-methoxy-14α,17α-ethylidenedioxy-19-nor-pregna-1,3,5(10),9(11)-tetraen-20-one in 100 ml. of anhydrous benzene was refluxed with 100 ml. of anhydrous asymm.-dimethylhydrazine for 72 hours. The benzene and the dimethyl hydrazine were removed by evaporation under reduced pressure and the residue was chromatographed on a silicagel-column with the eluent toluene-1% acetone. 2.2 g. of starting material were recovered and 0.53 g. of 3-methoxy-14α,17α-ethylidenedioxy-19-nor-pregna-1,3,5(10),9(11)-tetraen-20-one 20-N,N-dimethyl hydrazone were obtained.

Melting point: 133–135° C.

I.R. (in KBr): 3083, 3035, 2770, 1630, 1605, 1570, 1496, 1404, 1259, 1128, 1111, 1040, 804 cm.$^{-1}$.

N.M.R. (in CDCl$_3$): δ=0.77, 1.28 (doublet), 2.00, 2.44, 3.75, 5.20 (quadruplet), 6.20, 6.5, 6.6 and 7.5 (AB-spectrum) p.p.m.

Molecular ion peak in mass spectrum: 410.

Calculated for $C_{25}H_{34}O_3N_2$: 410.

EXAMPLE XXII

A solution of 5 g. of 3-methoxy-14α,17α-ethylidenedioxy-19-nor-pregna-1,3,5(10),9(11)-tetraen-20-one 20-hydrazone in 50 ml. of pyridine was stirred at room temperature with 2.5 ml. of acetic anhydride. After one hour water was added and from the cooled mixture 3.70 g. crystalline product could be isolated. After recrystallization from a methanol/methylene chloride mixture 3.60 g. of pure 3-methoxy-14α,17α-ethylidenedioxy-19-nor-pregna-1,3,5(10),9(11)-tetraen-20-one 20-n-acetyl hydrazone were obtained.

Melting point: 152–155° C.

I.R. (in KBr): 3185, 1680, 1630, 1608, 1568, 1498, 1405, 1238, 1125, 1110 cm.$^{-1}$.

N.M.R. (in CDCl$_3$): δ=0.77, 1.29 (doublet), 1.90, 2.24, 3.73, 5.2 (quadruplet), 6.2, 6.55, 6.6 and 7.5 (AB-spectrum), 9.05 p.p.m.

Molecular ion peak in mass spectrum: 424.

Calculated for $C_{25}H_{32}N_2O_4$: 424.

EXAMPLE XXIII

In an analogous way to the procedure described in Example XXII, 5 g. of 3-methoxy-14α,17α-ethylidenedioxy-19-nor-pregna-1,3,5(10),9(11)-tetraen-20-one 20-hydrazone were converted with 2.5 ml. of propionic anhydride into 4.20 g. of pure 3-methoxy-14α,17α-ethylidenedioxy- 19-nor-pregna-1,3,5(10),9(11)-tetraen-20-one 20-N-propionyl hydrazone.

Melting point: 203–205° C.

I.R. (in KBr): 3200, 3030, 1685, 1630, 1610, 1565, 1500, 1400, 1230, 1123, 1110 cm.$^{-1}$.

N.M.R. (in CDCl$_3$): $\delta$=0.75, 1.17 (triplet), 1.3 (doublet), 1.92, 2.65 (quadruplet), 3.7, 5.2 (quadruplet), 6.2, 6.55, 6.6 and 7.5 (AB-spectrum), 9.3 p.p.m.

Molecular ion peak in mass spectrum: 438.

Calculated for $C_{26}H_{34}N_2O_4$: 438.

EXAMPLE XXIV

In an analogous way to the procedure described in Example XXII, 5 g. of 3-methoxy-14α,17α-ethylidenedioxy-19-nor-pregna-1,3,5(10),9(11)-tetraen-20-one 20-hydrazone were converted with 4 ml. of pivalic anhydride into 5.3 g. of 3-methoxy-14α,17α-ethylidenedioxy-19-nor-pregna-1,3,5(10),9(11)-tetraen-20-one 20-N-pivaloyl hydrazone.

Melting point: 108–111° C.

I.R. (in KBr): 3435, 3300, 3060, 3027, 1660, 1605, 1568, 1510, 1496, 1403, 1230, 1128, 1110 cm.$^{-1}$.

N.M.R. (in CDCl$_3$): $\delta$=0.77, 1.3, 1.90, 3.4, 3.72, 5.2 (quadruplet), 6.2, 6.55, 6.6 and 7.5 (AB-spectrum), 8.40 p.p.m.

Molecular ion peak in mass spectrum: 466.

Calculated for $C_{28}H_{38}N_2O_4$: 466.

EXAMPLE XXV

A solution of 5 g. of 3-methoxy-14α,17α-ethylidenedioxy-19-nor-pregna-1,3,5(10),9(11)-tetraen-20-one 20-hydrazone in 50 ml. of pyridine was reacted for 2 hours with 10.5 of isonicotinic anhydride. The desired product was separated by column-chromatography (silicagel, with benzene-10% acetone as eluent) from some less polar materials. After crystallization from a methanol/water mixture 5.05 g. of pure 3-methoxy-14α,17α-ethylidenedioxy-19-nor-pregna-1,3,5(10),9(11)-tetraen-20-one 20-N-isonicotinoyl hydrazone were obtained.

Melting point: 127–132° C.

I.R. (in KBr): 3440, 3030, 2838, 1660, 1603, 1550, 1492, 1403, 1230, 1123, 1103 cm.$^{-1}$.

N.M.R. (CDCl$_3$+DMSO): $\delta$=0.75, 1.27 (doublet), 2.03, 3.70, 5.2, 6.2, 6.55, 6.6, 7.5 (multiplet), 8.6 (doublet), 10.1 p.p.m.

Molecular ion peak in mass spectrum: 487.

Calculated for $C_{29}H_{33}N_3I_4$: 487.

EXAMPLE XXVI

In an analogous way to the procedure described in Example XXII, 5 g. of 3-methoxy-14α,17α-ethylidenedioxy-19-nor-pregna-1,3,5(10),9(11)-tetraen-20-one 20-hydrazone were converted with 8 g. adamantane carbonyl chloride, into 6.5 g. of pure 3-methoxy-14α,17α-ethylidenedioxy-19-nor-pregna-1,3,5(10),9(11)-tetraen-20-one 20-N,N-diadamantane carbonyl hydrazone.

Melting point: 203–206° C.

I.R. (in KBr): 3025, 1750, 1645, 1603, 1565, 1491, 1399, 1125, 1110 cm.$^{-1}$.

N.M.R. (in CDCl$_3$): $\delta$=0.80, 1.27 (doublet), 1.70, 1.91, 1.95, 3.72, 5.2 (quadruplet), 6.2, 6.55, 6.6 and 7.5 (AB-spectrum) p.p.m.

EXAMPLE XXVII

In an analogous way to the procedure described in Example XXII, 5 g. of 3-methoxy-14α,17α-ethylidenedioxy-19-nor-pregna-1,3,5(10),9(11)-tetraen-20-one 20-hydrazone were converted with 6 ml. of pivalyl chloride to 4.45 g. of pure 3-methoxy-14α,17α-ethylidenedioxy-19-nor-pregna-1,3,5(10),9(11)-tetraen-20-one 20-N,N-dipivalyl hydrazone.

Melting point: 114–116° C.

I.R. (in KBr): 1751, 1649, 1607, 1570, 1495, 1223, 1120 cm.$^{-1}$.

N.M.R. (in CDCl$_3$): $\delta$=0.78, 1.2, 1.91, 3.7, 5.17 (quadruplet), 6.2, 6.55, 6.6 and 7.5 (AB-spectrum) p.p.m.

Molecular in peak in mass spectrum: 550.

Calculated for $C_{33}H_{46}N_2O_5$: 550.

EXAMPLE XXVIII 3 g. of 3-hydroxy-14α,17α-ethylidenedioxy-19-nor-pregna-1,3,5(10),9(11)-tetraen-20-one 20-N-methyl hydrazone were dissolved in 15 ml. of pyridine and reacted for 30 minutes at room temperature with 3.75 ml. of acetic anhydride. 10 ml. of methanol were added and the mixture was shaken with methyl isobutyl ketone. It was washed several times with water and the organic layer was concentrated by evaporation under reduced pressure. The residue was crystallized from heptane. 3.15 g. of 14α,17α-ethylidenedioxy-20-(N,N-methyl, acetylamino) imino-19-nor-pregna-1,3,5(10),9(11)-tetraen-3-yl 3-acetate were obtained.

Melting point: 170–173° C.

I.R. (in KBr): 3035, 1760, 1660, 1490, 1403, 1200, 1128, 1112 cm.$^{-1}$.

N.M.R. (in CDCl$_3$): $\delta$=0.80, 1.29 (doublet), 1.95, 2.02, 2.23, 3.10, 5.20 (quadruplet), 6.30, 6.75, 6.82, and 7.60 (AB-spectrum) p.p.m.

Molecular ion peak in mass spectrum: 466.

Calculated for $C_{27}H_{34}O_5N_2$: 466.

EXAMPLE XXIX

To a cooled solution of 2.5 g. of 3-hydroxy-14α,17α-ethylidenedioxy-19-nor-pregna-1,3,5(10),9(11)-tetraen-20-one 20-N-methylhydrazone in 20 ml. of pyridine 3 ml. of 2-thiophene carbonyl chloride were dropwise added. After 15 minutes water was added, the mixture was shaken with methyl isobutyl ketone and several times washed with water. After concentration of the organic layer by evaporation under reduced pressure the residue was purified by chromatography on a silicagel column. Eluent was benzene-2% acetone. The yield was after crystallization from methanol 3.1 g. of pure 14α,17α-ethylidenedioxy-20-(N,N-methyl 2-thiophene carbonyl-amino) imino-19-nor-pregna-1,3,5(10),9(11)-tetraen-3-yl 3-thiophene carboxylate.

Melting point: 206–209° C.

I.R. (in KBr): 3113, 3093, 3030, 1727, 1630, 1522, 1488, 1258, 1208, 1111, 1058 728 cm.$^{-1}$

N.M.R. (in CDCl$_3$, DMSO-$d_6$, pyr-$d_5$): $\delta$=0.85, 1.37 (doublet), 2.05, 3.34, 5.31 (quadruplet), 6.37 (broad), 6.9–8.0 (multiplet) p.p.m.

Molecular ion peak in mass spectrum: 602.

Calculated for $C_{33}H_{34}N_1O_5S_2$: 602.

EXAMPLE XXX

To a solution of 2.5 g. of 3-hydroxy-14α,17α-ethylidenedioxy-19-nor-pregna-1,3,5(10),9(11) - tetraen - 20-one 20-N-methyl hydrazone in 20 ml. of pyridine 7 g. of adamantane carbonyl chloride were added. The mixture was stirred for 16 hours at room temperature. Next, water was added and the mixture was shaken with methyl isobutyl ketone. It was washed with water several times and the organic layer was concentrated by evaporation under reduced pressure. The residue was chromatographed on a silicagel column with the eluent benzene-2% acetone. From the correct fractions 2.38 g. of pure 14α,17α-ethylidenedioxy - 20 - (N,N-methyl, adamantane carbonyl amino)imino-19-nor-pregna - 1,3,5(10),9(11) - tetraen-3-yl 3-adamantane carboxylate were obtained (after crystallization from a methanol/methylene chloride mixture).

Melting point: 194–198° C.

I.R. (in KBr): 3030, 1756, 1650, 1438, 1405, 1205, 1113, 1103, 1053 cm.$^{-1}$.

N.M.R. (in CDCl$_3$): $\delta$=0.81, 1.32 (doublet), 197, 1.83 and 2.05, 3.07, 5.23 (quadruplet), 6.30 (broad), 6.7, 6.6 and 7.7 (AB-spectrum) p.p.m.

EXAMPLE XXXI

To a solution of 42 g. of semicarbazide hydrochloride in 105 ml. of water 105 ml. of sodium hydroxide solution (10%) were added. The mixture was filtrated and then added to a hot solution of 10.5 g. of 3-methoxy-14α, 17α-ethylidenedioxy - 19 - nor-pregna-1,3,5(10),9(11)-tetraen-20-one in 735 ml. of ethanol (96%). After half a minute a turbidity appeared. The precipitate was filtered, dried and recrystallized from a mixture of dimethyl formamide and methyl isobutyl ketone. 5.5 g. of pure 3-methoxy-14α,17α-ethylidenedioxy - 19 - nor-pregna-1,3,5(10), 9(11)-tetraen-20-one 20-semicarbazone were obtained.

Melting point: 263–266° C.

I.R. (in KBr): 3480, 3190, 3030, 1700, 1630, 1604, 1565, 1493, 1255, 1125, 1110 cm.$^{-1}$.

N.M.R. (in CDCl$_3$, DMSO-$d_6$, pyr-$d_5$): $\delta$=0.72, 1.22 (doublet), 1.87, 3.72, 5.2 (quadruplet), 6.25, 6.62, 6.70 and 1.51 (AB-spectrum) p.p.m.

Molecular ion peak in mass spectrum: 425.

Calculated for C$_{24}$H$_{31}$O$_4$N$_3$: 425.

EXAMPLE XXXII

A solution of 5 g. of methoxy-14α,17α-ethylidenedioxy-19-nor-pregna-1,3,5(10),9(11) - tetraen - 20-one in 50 ml. of dimethylformamide and 50 ml. of methanol was refluxed for 18 hours with 3 g. of Girard's T reagent.

The reaction mixture was cooled and dissolved in methyl isobutyl ketone. The solvent was evaporated under pressure. The residue was dissolved in methylene chloride and chromatographed on a silicagel column with the eluent methylene chloride-20% methanol.

After evaporating of the solvent of the correct fractions the residue was crystallized from methanol and 4.35 g. of the pure Girard's T derivative of 3-methoxy-14α,17α-ethylidenedioxy-19-nor-pregna - 1,3,5(10),9(11) - tetraen-20-one were obtained.

Melting point: 253–255° C. (destr.).

I.R. (in KBr): 3420, 3150, 1699, 1630, 1609, 1568, 1535, 1498, 1405, 1230, 1110 cm.$^{-1}$.

N.M.R. (in CDCl$_3$+DMSO): $\delta$=0.80, 1.29 (doublet), 2.20, 3.47, 3.77, 4.85 (doublet), 5.21 (quadruplet), 6.20 (broad), 6.58 6.68 and 7.55 (AB-spectrum) p.p.m.

What we claim and desire to secure by Letters Patent is:

1. 20-iminopregnatetraene derivative of the formula:

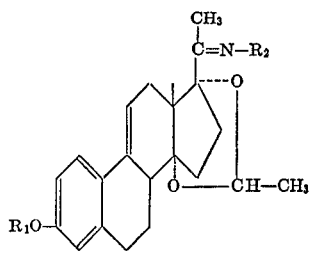

wherein R$_1$ represents a hydrogen atom, a lower alkyl group having less than 4 carbon atoms and which may be substituted by a dimethylamino group, or an acyl residue derived from an organic carboxylic acid having less than 12 carbon atoms or an acyl residue derived from sulfuric acid; R$_2$ represents a hydroxyl group or OR$_3$, wherein R$_3$ represents a lower alkyl group having less than 5 carbon atoms, a benzyl group or an acyl residue derived from an organic carboxylic acid having less than 15 carbon atoms or an acyl residue from sulfuric acid, or R$_2$ represents —NH$_2$, the group —NHCONH$_2$ the group

—NH—CO—CH$_2$—N$^+$(CH$_3$)$_3$

CL$^-$ or a group

wherein R$_4$ represents a hydrogen atom, a methyl group or an acyl residue derived from an organic carboxylic acid, having less than 12 carbon atoms and R$_2$ represents an alkyl group having less than 4 carbon atoms or an acyl residue derived from an organic carboxylic acid having less than 12 carbon atoms.

2. 20-iminopregnatetraene derivative according to claim 1, wherein R$_1$ represents a methyl group and R$_2$ represents a hydroxyl group or a group R$_3$, wherein R$_3$ represents a lower alkyl group having less than 5 carbon atoms, a benzyl group or an acyl residue derived from an organic carboxylic acid having less than 15 carbon atoms.

3. 20-imiopregnatetraene derivative according to claim 1, wherein R$_1$ represents a hydrogen atom or the β-dimethylaminoethyl group and R$_2$ represents a hydroxyl.

4. 20-iminopregnatetraene derivative according to claim 1, wherein R$_1$ and R$_3$ represent an acyl residue derived from an sulfuric acid.

5. 20-iminopregnatetraene derivative according to claim 1, wherein R$_1$ represents a methyl group and R$_2$ represents —NH$_2$ or —NHCONH$_2$, the group —NH—CO—CH$_2$—N$^+$(CH$_3$)$_3$Cl$^-$ or a group —NR$_4$R$_5$, wherein R$_4$ and R$_5$ are as defined in claim 1.

6. 20-iminopregnatetraene derivative according to claim 1, wherein R$_1$ represents a hydrogen atom or an alkyl group having less than 4 carbon atoms, R$_4$ represents a hydrogen atom and R$_5$ represents the methyl group.

7. 20-iminopregnatetraene derivative according to claim 1, wherein R$_1$ and R$_5$ are the same and represent an acyl residue derived from an organic carboxylic acid having less than 12 carbon atoms and R$_4$ represents a methyl group.

8. 20-iminopregnatetraene derivative according to claim 1, which is 3-methoxy-14α,17α-ethylidenedioxy-19 - nor-pregna-1,3,5(10),9(11)-tetraene-20-one 20 oxime.

9. 20-iminopregnatetraene derivative according to claim 1, which is 3-hydroxy-14α,17α-ethylidenedioxy - 19 - nor-pregna-1,3,5(10),9(11)-tetraen-20-one 20-oxime.

10. 20-iminopregnatetraene derivative according to claim 1, which is 3-methoxy-14α,17α-ethylidenedioxy-19-nor-pregna-1,3,5(10),9(11)-tetraen-20-one 20-O - methyl-oxime.

11. 20-iminopregnatetraene derivative according to claim 1, which is 3-methoxy-14α,17α-ethylidenedioxy-19-nor-pregna-1,3,5(10),(11)-tetraen-20-one 20-O - benzyl-oxime.

12. 20-iminopregnatetraene derivative according to claim 1, which is 3-methoxy-14α,17α-ethylidenedioxy-19-nor-pregna-1,3,5(10),9(11)-tetraen-20-one 20-O-n-propyl-oxime.

13. 20-iminopregnatetraene derivative according to claim 1, which is 3-methoxy-14α,17α-ethylidenedioxy-19-nor-pregna-1,3,5(10),9(11)-tetraen - 20 - one 20 - O - (2-methyl)propyl-oxime.

14. 20-iminopregnatetraene derivative according to claim 1, which is 3-(2-dimethylamino)ethoxy - 14α,17α-ethylidenedioxy-19-nor-pregna-1,3,5(10),9(11) - tetraen-20-one 20-oxime.

15. 20-iminopregnatetraene derivative according to claim 1, which is 3-methoxy-14α,17α-ethylidenedioxy-19-nor-pregna-1,3,5(10),9(11)-tetraen-20-one 20-O - acetyl-oxime.

16. 20-iminopregnatetraene derivative according to claim 1, which is 3-methoxy-14α,17α-ethylidenedioxy-19-nor-pregna-1,3,5(10),9(11)-tetraen-20-one 20-O-pivaloyl-oxime.

17. 20-iminopregnatetraene derivative according to claim 1, which is 3-methoxy-14α,17α-ethylidenedioxy-19-nor-pregna-1,3,5(10),9(11)-tetraen-20-one 20-O-isonicotinoyl-oxime.

18. 20-iminopregnatetraene derivative according to claim 1, which is 3-methoxy-14α,17α-ethylidenedioxy-19- nor-pregna-1,3,5(10),9(11)-tetraen-20-one 20-O-benzoyl-oxime.

19. 20-iminopregnatetraene derivative according to claim 1, which is 3-methoxy-14α,17α-ethylidenedioxy 19-nor-pregna-1,3,5(10),9(11)-tetraen-20 - one 20 - O-adamtanecarbonyl-oxime.

20. 20-iminopregnatetraene derivative according to claim 1, which is 3-methoxy-14α,17α-ethylidenedioxy-19-nor-pregna-1,3,5(10),9(11)-tetraen-20-one 20-O - myristoyl-oxime.

21. 20-iminopregnatetraene derivative according to claim 1, which is 14α,17α-ethylidenedioxy-29-hydrogen sulphate imino-19-nor-pregna-1,3,5(10),9(11)-tetraen-3-yl 3-hydrogen sulphate.

22. 20-iminopregnatetraene derivative according to claim 1, which is 3-methoxy-14α,17α-ethylidenedioxy-19-nor-pregna-1,3,5(10),9(11)-tetraen-20-one 20-hydrazone.

23. 20-iminopregnatetraene derivative according to claim 1, which is 3-methoxy-14α,17α-ethylidenedioxy-19-nor-pregna-1,3,5(10),9(11)-tetraen-20-one 20-N-methyl hydrazone.

24. 20-iminopregnatetraene derivative according to claim 1, which is 3-hydroxy-14α,17α-ethylidenedioxy-19-nor-pregna-1,3,5(10),9(11)-tetraen-20-one 20-N-methyl hydrazone.

25. 20-iminopregnatetraene derivative according to claim 1, which is 3-isopropoxy-14α,17α-ethylidenedioxy-19-nor-pregna-1,3,5(10),9(11)-tetraen - 20 - one 20 - N-methyl hydrazone.

26. 20-iminopregnatetraene derivative according to claim 1, which is 3-methoxy-14α,17α-ethylidenedioxy-19-nor-pregna-1,3,5(10),9(11)-tetraen-20-one 20-N-ethyl hydrazone.

27. 20 - iminopregnatetraene derivative according to claim 1, which is 3-methoxy-14α,17α-ethylidenedioxy-19-nor-pregna-1,3,5(10),9(11)-tetraen-20-one 20-N - propyl hydrazone.

28. 20-iminopregnatetraene derivative according to claim 1, which is 3-methoxy-14α,17α-ethylidenedioxy-19-nor-pregna-1,3,5(10),9(11)-tetraen-20-one 20-N,N - dimethyl hydrazone.

29. 20-iminopregnatetraene derivative according to claim 1, which is 3-methoxy-14α,17α-ethylidenedioxy-19-nor-pregna-1,3,5(19),9(11)-tetraen-20-one 20-N - acetyl hydrazone.

30. 20-iminopregnatetraene derivative according to claim 1, which is 3-methoxy-14α,17α-ethylidenedioxy-19-nor-pregna-1,3,5(10),9(11)-tetraen-20-one 20-N - propionyl hydrazone.

31. 20-iminopregnatetraene derivative according to claim 1, which is 3-methoxy-14α,17α-ethylidenedioxy-19-nor-pregna-1,3,5(10),9(11)-tetraen-20-one 20-N-pivaloyl hydrazone.

32. 20-iminopregnatetraene derivative according to claim 1, which is 3-methoxy-14α,17α-ethylidenedioxy-19-nor-pregna-1,3,5(10),9(11)-tetraen-20-one 20-N-isonicotinoyl hydrazone.

33. 20-iminopregnatetraene derivative according to claim 1, which is 3-methoxy-14α,17α-ethylidenedioxy-19-nor-pregna-1,3,5(10),9(11)-tetraen-20-one 20 - N,N - di adamantane carbonyl hydrazone.

34. 20-iminopregnatetraene derivative according to claim 1, which is 3-methoxy-14α,17α-ethylidenedioxy-19-nor-pregna-1,3,5(10),9(11)-tetraene-20-one 20-N,N - dipivaloyl hydrazone.

35. 20-iminopregnatetraene derivative according to claim 1, which is 14α,17α-ethylidenedioxy - 20 - (N,N-methyl, acetylamino) imino-19-nor - pregna - 1,3,5(10), 9(11)-tetraen-3-yl 3-acetate.

36. 20-iminopregnatetraene derivative according to claim 1, which is 14α,17α-ethylidenedioxy - 20 - (N,N-methyl,2-thiophene carbonyl-amino) imino-19-nor-pregna-1,3,5(10),9(11)-tetraen-3-yl-3 thiophene carboxylate.

37. 20-iminopregnatetraene derivative according to claim 1, which is 14α,17α-ethylidenedioxy - 20-(N,N-methyl, adamantane carbonyl amino) imino - 19 - nor-pregna-1,3,5(10),9(11)-tetraen-3-yl - 3 adamantane carboxylate.

38. 20-iminopregnatetraene derivative according to claim 1, which is 3-methoxy-14α,17α-ethyldienedioxy-19-nor-pregna-1,3,5(10),9(11)-tetraen-20-one 20-semicarbazone.

39. 20-iminopregnatetraene derivative according to claim 1, which is 3-methoxy-14α,17α-ethylidenedioxy-19-nor-pregna-1,3,5(10),9(11)-tetraen-20-one in the form of its Girard's T derivative.

40. Pharmaceutical composition which comprises as the active ingredient, at least one 20-iminopregnatetraene derivative as defined in claim 1 in a pharmacologically effective amount in association with a non-toxic pharmaceutically acceptable carrier.

References Cited
UNITED STATES PATENTS

| | | | |
|---|---|---|---|
| 3,585,192 | 6/1971 | Marx et al. | 260—239.55 |
| 3,560,486 | 2/1971 | Marx et al. | 260—239.55 |

OTHER REFERENCES

"Steroids Reactions" by Djerassi, pp. 61 and 62, relied on (1963), San Francisco, published by Holden-Day, Inc.

ELBERT L. ROBERTS, Primary Examiner

U.S. Cl. X.R.

195—51; 260—397.45